US008950110B2

(12) United States Patent
Fula

(10) Patent No.: US 8,950,110 B2
(45) Date of Patent: *Feb. 10, 2015

(54) FOLDABLE PLANTER OR HOLDER

(71) Applicant: Joseph F Fula, Danvers, MA (US)

(72) Inventor: Joseph F Fula, Danvers, MA (US)

(*) Notice: Subject to any disclaimer, the term of this patent is extended or adjusted under 35 U.S.C. 154(b) by 148 days.

This patent is subject to a terminal disclaimer.

(21) Appl. No.: 13/803,653

(22) Filed: Mar. 14, 2013

(65) Prior Publication Data

US 2013/0193148 A1 Aug. 1, 2013

Related U.S. Application Data

(63) Continuation-in-part of application No. 13/277,155, filed on Oct. 19, 2011, now Pat. No. 8,429,852.

(51) Int. Cl.
*A01G 9/02* (2006.01)
*B65D 25/04* (2006.01)

(52) U.S. Cl.
CPC .............. *B65D 25/04* (2013.01); *A01G 9/026* (2013.01)
USPC ...................... 47/66.3; 47/65.7; 47/67; 47/85

(58) Field of Classification Search
USPC .................. 47/65.7, 65.8, 66.3, 66.4, 67, 85; 229/117.01, 117.05, 117.06, 120.17; 220/6, 4.25, 530, 529
See application file for complete search history.

(56) References Cited

U.S. PATENT DOCUMENTS

| | | | |
|---|---|---|---|
| D33,542 S | 11/1900 | Beltz | |
| 782,544 A | 2/1905 | Carrier | |
| 1,020,617 A | 3/1912 | Matthews | |
| D85,957 S | 1/1932 | Potter | |
| 1,951,642 A | 3/1934 | Augustin et al. | |
| 2,299,182 A | 10/1942 | Schoof | |
| D161,026 S | 11/1950 | Hollander | |
| 2,841,055 A | 7/1958 | Denison | |
| 2,893,167 A | 7/1959 | Davidson | |
| D195,617 S | 7/1963 | Eger | |
| 3,729,858 A | 5/1973 | Bradshaw | |
| D237,333 S | 10/1975 | Knowles | |
| D239,192 S | 3/1976 | Wiles | |
| 4,057,931 A | 11/1977 | Stutelberg et al. | |
| 4,091,926 A | 5/1978 | Cravens | |
| 4,091,928 A | 5/1978 | Bernardo | |
| 4,145,841 A | 3/1979 | Woolpert | |

(Continued)

FOREIGN PATENT DOCUMENTS

GB 2199224 A 7/1988
JP 03292819 A 12/1991

(Continued)

*Primary Examiner* — Son T Nguyen
*Assistant Examiner* — Kathleen Alker
(74) *Attorney, Agent, or Firm* — Antoinette G. Giugliano; AGG Intellectual Property Law

(57) ABSTRACT

The present invention relates to a foldable planter or holder. The planter or holder of the present invention includes one or more foldable compartments defined by an array of panels. Each compartment includes one or more upright panels to form an upright core; one or more movable panels to form a trough used for planting or storing belongings; and one or more fold lines, wherein at least one fold line is between the one or more upright panels and the one or more movable panels. In an embodiment, each panel is attached to at least one adjacent panel along a fold line. When the planter or holder is not in use, the movable panel pair folds at a fold line between the upright panel and the movable panel.

17 Claims, 10 Drawing Sheets

(56) References Cited

U.S. PATENT DOCUMENTS

| | | |
|---|---|---|
| 4,254,902 A | 3/1981 | Whitney |
| 4,268,994 A | 5/1981 | Urai |
| 4,355,485 A | 10/1982 | Frank |
| 4,418,497 A | 12/1983 | Mastriano |
| 4,453,665 A | 6/1984 | Roccaforte et al. |
| 4,614,056 A | 9/1986 | Farkas |
| D291,667 S | 9/1987 | Wouters |
| 4,869,019 A | 9/1989 | Ehrlich |
| 4,912,876 A | 4/1990 | Ginsberg |
| D309,878 S | 8/1990 | Mason, Jr. |
| 5,060,849 A | 10/1991 | King |
| 5,123,588 A | 6/1992 | Harris |
| 5,245,786 A | 9/1993 | Sorrow |
| 5,381,625 A | 1/1995 | Wente |
| 5,501,040 A | 3/1996 | White-Wexler et al. |
| 5,826,375 A | 10/1998 | Black |
| 6,058,651 A | 5/2000 | Perez |
| 6,105,307 A | 8/2000 | Helmy |
| 6,408,570 B1 | 6/2002 | Shih et al. |
| 6,442,895 B1 | 9/2002 | Van Roey |
| 6,612,073 B1 | 9/2003 | Powell et al. |
| 6,637,156 B2 | 10/2003 | Stewart |
| 6,901,700 B2 | 6/2005 | Trabka |
| 6,915,606 B2 | 7/2005 | Lantier et al. |
| 7,080,482 B1 | 7/2006 | Bradley |
| 7,516,574 B2 | 4/2009 | Gottlieb et al. |
| D603,181 S | 11/2009 | Garlington |
| 7,690,151 B2 | 4/2010 | Wilkes |
| 7,712,254 B2 | 5/2010 | Klohr et al. |
| 7,854,091 B1 | 12/2010 | Chang |
| 2001/0052199 A1 | 12/2001 | Klein et al. |
| 2005/0144841 A1 | 7/2005 | Hjorth |
| 2009/0000189 A1 | 1/2009 | Black |
| 2009/0223123 A1 | 9/2009 | Weder |
| 2009/0260282 A1 | 10/2009 | Hashimoto et al. |
| 2009/0293350 A1 | 12/2009 | Kania et al. |
| 2010/0132255 A1 | 6/2010 | Webber |
| 2010/0242359 A1 | 9/2010 | Rance, Jr. |
| 2011/0210162 A1 | 9/2011 | Goldman et al. |

FOREIGN PATENT DOCUMENTS

| | | |
|---|---|---|
| WO | WO 93/22899 | 11/1993 |
| WO | WO 2011/005655 | 1/2011 |

US 8,950,110 B2

FOLDABLE PLANTER OR HOLDER

RELATED APPLICATION

This application is a continuation-in-part of U.S. application Ser. No. 13/277,155, filed Oct. 19, 2011, entitled "Foldable Planter" by Joseph F. Fula. The entire teachings of the above application are incorporated herein by reference.

BACKGROUND OF THE INVENTION

Growing plants generally involves the use of ceramic pots, and other planting accessories which take up space. The storage of pots can consume much needed space that may not be available to those that live in apartments and in small spaces.

Additionally, planters are often one size and allow for plantings that accommodate that size. Accordingly, if the planter is too large or too small to accommodate the number of plants to be planted in the pot, then one generally opts not to use it since it will impact the growth of the plants therein.

Similarly, storage of household items, office supplies, or other belongings also take up space. This is problematic in confined or small spaces such as cubicles, offices, and apartments.

Hence, a need exists for a planter or holder that can be efficiently stored. In particular, a need exists for a planter or holder that can be folded or collapsed so that it can be stored in a small space. Additionally, a need exists for a planter or holder that allows one to fold away compartments that are not being used to accommodate the number of plantings or belongings.

SUMMARY OF THE INVENTION

The present invention relates to a foldable planter or holder that includes one or more foldable compartments defined by an array of panels. Each compartment has one or more upright panels to form an upright core; one or more movable panels to form a trough used for plantings or storing belongings; and one or more fold lines, wherein at least one fold line exists between the upright panel and the movable panel. In an aspect, each panel is attached to at least one adjacent panel along a fold line. When not in use, the movable panel pair folds at a fold line between the upright panel and the movable panel. In an embodiment, a second fold line can transect the fold line between the upright panel and the movable panel. A panel can have a number of sides including one, two, three, four or more sides. The planter or holder can optionally include a stand to hold the foldable planter or holder upright or a means for hanging the planter or holder (e.g., chains, loops, hooks, and the like).

In another embodiment, the foldable planter or holder of the present invention includes a plurality of foldable compartments defined by an array of panels, wherein each panel being attached to at least one adjacent panel along a fold line, wherein when in use, the compartment has an upright panel pair and a movable panel pair to form a trough. In an aspect, the upright panel pair abuts a second upright panel pair of another compartment to form a partition between the compartments. Additionally, the movable panel pair can have more than one fold line between adjacent panels. The movable panel pair can fold at fold lines existing between adjacent panels. In an aspect, the upright panel pair has a center fold line between each upright panel, and the movable panel pair has a center fold line between each movable panel. In this case, the panels of the movable panel pair fold in a plane created by two axes of the fold lines existing between adjacent panels. Additionally, the panel of the movable panel pair folds and transects a plane created by the center fold line of the upright panels and the center fold line of the movable panels.

In yet another embodiment, the present invention relates to foldable planter or holder that involves an upright core; one or more movable panels to form a trough used for planting or storing belongings; and one or more fold lines, wherein at least one fold line separates the upright core from the one or more movable panels. The core, when in use, comprises one or more upright panels.

The present invention embodies a foldable planter or holder system. The system includes the parts of foldable planter or holder described herein including a core; one or more movable panels to form a trough used for planting or storing belongings; and one or more fold lines, wherein at least one fold line separates the upright core from the one or more movable panels. The system can further include a stand or a means for hanging the planter or holder.

Methods of using the foldable planter or holder are encompassed by the present invention. The methods include the steps of opening the movable flap to an open position; and placing a plant and/or soil components, or belongings therein.

Methods of storing the foldable planter or holder includes the steps of closing the movable flap to a closed position; and collapsing the foldable planter or holder into a flattened configuration; and storing the flattened configuration of the foldable planter or holder.

Methods of making the foldable planter or holder includes e.g., the steps of creating a mold from the reverse three dimensional conformation of the foldable planter or holder; poring a moldable material into the mold and allowing the moldable material to harden; and coining or scoring the one or more fold lines.

Advantageously, the folding planter or holder of the present invention allows for one to utilize a multi-compartment planter or holder for planting a variety of plants or for storing belongings, as the case may be. The unique design of the foldable planter or holder allows one to use as many of the compartments as desired or needed, and the compartments that are not in use can be simply folded back and out of the way. Additionally, the planter or holder can be folded and fully collapsed so that it can be stored in a flattened position, which is efficient and ideal for apartment living, or for small spaces.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to a foldable planter or holder. The present invention has panels or faces that form one or more troughs for planting seeds or storing belongings, but is foldable to allow for compact storage. This is particularly desirable for apartment living where storage and/or space is minimal. The term "holder" is interchangeable with "planter," and the term "planter" is used when the holder is used for plantings.

Figure 1:
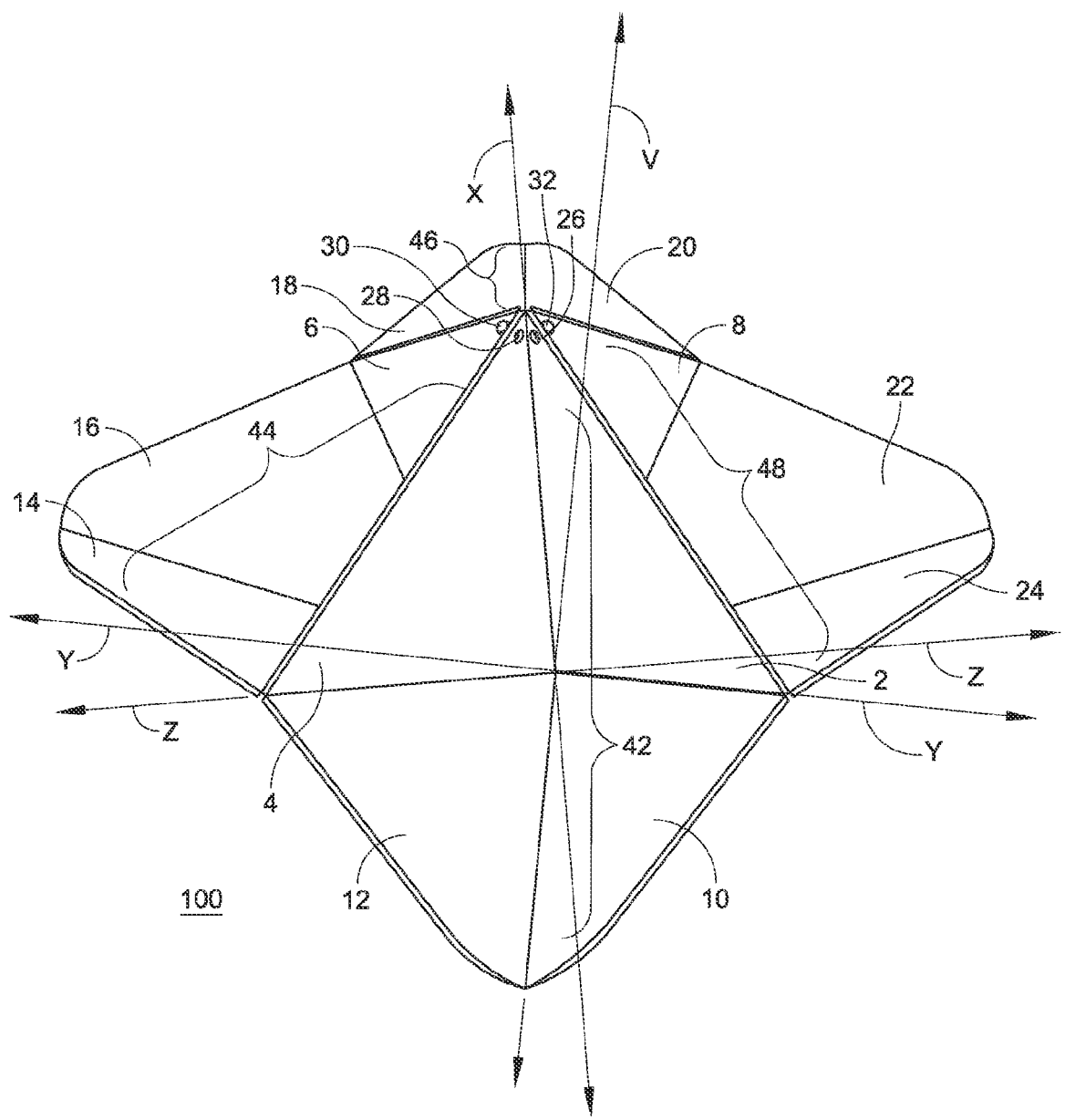
FIG. 1 is a perspective view of the foldable planter or holder of the present invention showing the foldable panels in an open position.

Referring to FIG. 1, planter or holder 100 has twelve panels that form four compartments. When the compartments are in an open position, they form troughs, namely troughs 42, 44, 46, and 48, for planting seeds and plants or for storing belongings. In particular, the panels can be upright panels or movable panels. FIG. 1 shows upright panels 2, 4, 6, and 8, and movable panels 10, 12, 14, 16, 18, 20, 22, and 24. When in an open position, as shown in FIG. 1, a trough is formed by a pair of upright panels and a pair of movable panels. For example, trough 42 is formed by upright panels 2 and 4, and movable panels 10 and 12; trough 44 is formed by upright panels 4 and 6 and movable panels 14 and 16; trough 46 is formed by upright panels 6 and 8, and movable panels 18 and 20; and trough 48 is formed by upright panels 8 and 2, and movable panels 22 and 24. In this embodiment, the upright panels form partitions between the troughs or compartments. Additionally, in the embodiment shown in the figures, at least one upright panel is attached to another upright panel at a center fold line. For example, upright panel 4 forms a side of trough 42 and a side of trough 44. In the embodiment shown in FIG. 1, each upright panel forms a side of at least two different troughs.

The present invention can have two or more upright panels and the number and size of the panels depend on the desired size of the trough. For example, the present invention can have from about 2 to about 10 upright panels in an embodiment. In an embodiment, a trough can be formed by at least 3 upright panels, in which case the two side panels can be similar to that shown in FIG. 2 and the middle panel can be a rectangularly shaped panel to allow for expansion of the trough's width.

In an embodiment, the panels can have a straight smooth surface. In other embodiments, the panels can take the form of an accordion like surface that can be collapsed or expanded as desired to expand the size of the trough, or be folded and stored. In yet other embodiments, the panels can have porous surface to allow for air, light, drainage of water, and passage of other entities.

In FIG. 1, the upright panels have two faces and are essentially of a triangular shape. The panels of the present invention can have additional faces and, in an embodiment, can form a three-dimensional shape such as a wedge. The face of the panels described herein can be of any shape or size so long as the face, when the planter or holder is in an open position, forms a side of the trough. For example, the face or sides of the panels can be triangular, curved, trapezoidal, accordion shaped, or irregularly shaped.

Figure 6:
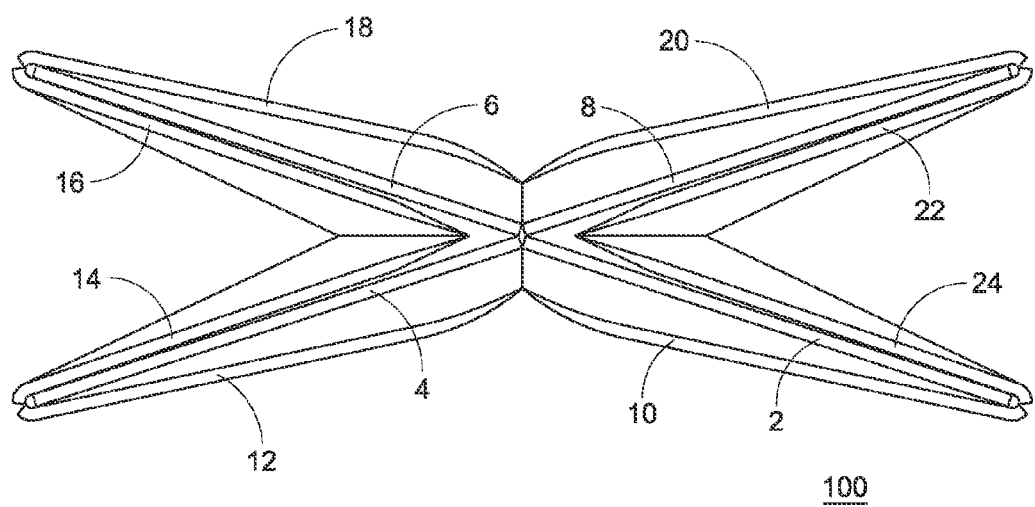
FIG. 6 is a top view of the foldable planter or holder of the present invention showing all of foldable panels in a closed position, and the planter or holder in the process of being put into a flattened configuration.
Figure 7:
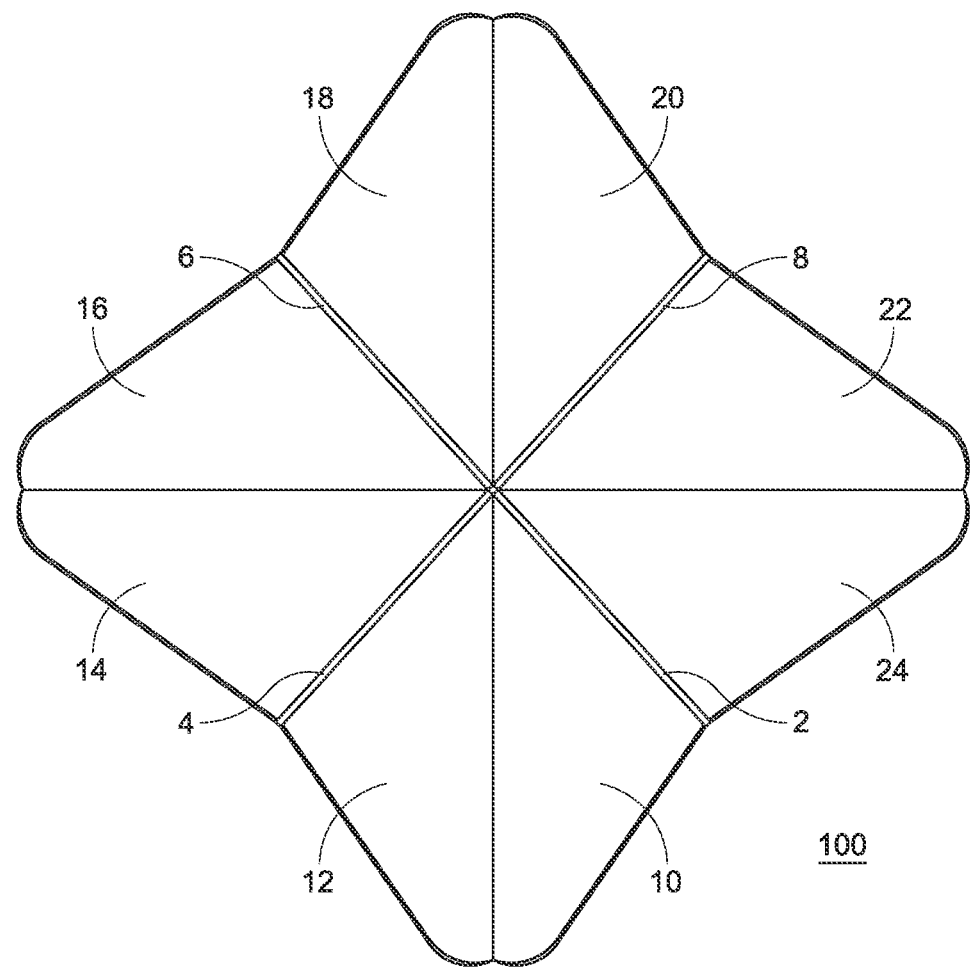
FIG. 7 is a top view of the foldable planter or holder of the present invention showing all of foldable panels in an opened position.

The panels of the present invention are attached to one another at a fold line (e.g., a center fold line) and at an angle that can be adjusted when using the foldable planter or holder (e.g., when in use or when folded and stored). In a particular aspect, each upright panel is attached to at least one other upright panel and one foldable panel at a fold line. The angle of an upright panel in relation to another upright depends on the extent that it is collapsed or opened. In some embodiments, when the planter or holder is in an opened position, as shown in FIG. 1 and FIG. 7, the upright panels are generally perpendicular to one another and form about a 90 degree angle in relation to one another. The angles of the upright panels in the open position allow the troughs to be formed and to be filled with soil, plantings, or other belongings. Plants and soil are included in the definition of belongings. When the planter or holder is in the closed or collapsed position, as shown in FIG. 6, the angles form two obtuse angles (e.g., 91 degrees to 179 degrees) between upright panels 6 and 8 and between upright panels 2 and 4. Additionally, two acute angles (e.g., 1 degree to 89 degrees) are formed between upright panels 4 and 6 and between upright panels 8 and 2. In either position, open or closed, angles shared between the upright panels add up to 360 degrees. From the top view shown in FIGS. 6 and 7, the upright panels form an "X" configuration.

The upright panels are joined at an X axis as shown in FIG. 1. In this embodiment, each of the upright panels has an edge that is attached to one another at the X axis. When in the open position and in use, in an aspect, the upright panels are generally in a substantially vertical position.

The X axis forms the center of the planter or holder. The center of the planter or holder can be an axis, as shown, and the upright panels form a core, referred to herein as an "upright core." In an embodiment, the upright core is formed by four upright panels. However, the core can also be defined by a three dimensional center around which the upright panels are attached. For example, the core can have a rectangularly shaped prism to which the upright panels are attached. The sides of the core can form a side of the trough when the planter or holder is in an open position. This can be of any shape (e.g., sphere, cube, cylinder, irregularly shaped prism) or configuration so long as the core can collapse when the planter or holder is not in use and support the upright panels.

FIG. 1 shows upright panels that have openings to receive a loop or hanger. planter or holder 100 has openings 26, 28, 30, and 32 to receive a loop or hanger. These openings are further described herein.

The foldable planter or holder of the present invention also includes foldable panels. The phrase "foldable panel" and "movable panel" are used interchangeably herein. FIG. 1 shows foldable panels 10, 12, 14, 16, 18, 20, 22, and 24.

Planter or holder 100 has eight foldable panels or four foldable panel pairs. Each panel of a panel pair forms a side of a trough. For example, panels 10 and 12 are a panel pair that forms sides of trough 42. The panel pairs are also referred to herein as "flaps." The planter or holder can have more or less foldable panels as desired. The number of foldable panels can depend on the number of troughs, the size of the troughs, the number of upright panels, the existence of a core, and the like. The planter or holder of the present invention can have e.g., between about 1 and 20 foldable panels.

In FIG. 1, the foldable panels have two faces and are essentially of a triangular shape. The face of the foldable panels can be of any shape or size so long as the face, when the planter or holder is in an open position, forms a side of the trough. For example, the face or sides of the panels can be triangular, curved, trapezoidal, or irregularly shaped.

As shown in the figures, the foldable panels are attached at a fold line to at least one upright panel and to at least one foldable panel. In particular, foldable panel 10 attaches to upright panel 2 at a fold line defined by Axis Y and foldable panel 12 attaches to upright panel 4 at a fold line defined by Axis Z. Both Axis Y and Z transect Axis X, the axis at which one side of the upright panels is joined.

In this embodiment, each foldable panel is attached to at least one other foldable panel at a center fold line. In an embodiment, a foldable panel is attached to another foldable panel at an angle less than 180 degrees (e.g., between about 45 degrees and about 179 degrees) with respect to one another. For example, panel 10 is joined at a fold line defined by Axis V to panel 12. The center of upright panels 2 and 4 and foldable panels 10 and 12 is the point at which Axes V, X, Y, Z intersect. When the foldable panels are in the open position and form a trough, as shown in FIG. 1, the foldable panels form an acute angle with respect to the upright panels. In other words, Axis V and Axis X form an acute angle (e.g., between about a 30 degree angle and about an 89 degree angle). See FIGS. 2 and 8 for a view of a trough and the angle between Axis X and Axis V. The acute angle is generally greater than about 30 degrees so as to form a trough into which belongings (e.g., soil, plantings, office supplies, household items) can be placed.

When in an open position, the angle between the foldable panel pairs of a trough, e.g., panels 10 and 12 along Axis V, is less than about 180 degrees, and preferably between about 30 degrees and about 120 degrees. In an embodiment, this angle is about a 90 degree angle.

The flaps of the foldable panels can be moved from an open position to a closed position. As described herein, an open position is shown in FIG. 1. The flaps comprising of foldable panels 10 and 12 can be folded along Axis Y and Axis Z toward upright panels 2 and 4 to the closed position. This flap is shown in the closed position in FIGS. 2, 3, and 4. As the flap closes, the angle between the flap and the upright panels (e.g., the angle between Axis V and Axis X) decreases. In the closed position, the angle between these axes are close to zero (e.g., between about 1 and about 5 degrees). As the flap closes, the fold lines at Axis Y and Axis Z are engaged. The top face of a foldable panel, e.g., panel 10 meets the front face of an upright panel, e.g., panel 2. The number of foldable panels can impact the angle at which the foldable panels fold toward the upright panels.

Put another way, the foldable panel pair folds in alignment with a plane created by two axes of the fold lines existing between adjacent panels. For example, foldable panel 10 moves in a plane created by Axis Y and Axis V, and foldable panel 12 moves along a plane created by Axis Z and Axis V.

Additionally, the foldable panels, in an embodiment, can be separated from one another or from the upright panel, by an additional panel or member. In such an embodiment, the additional panel or member preferably collapses or folds as well.

The size of each panel, both upright and foldable, can be of any size, and in an embodiment, ranges from 2 inches to about 20 inches (e.g., between about 4 and about 10 inches). In an embodiment shown in the figures, the sides of the panels range between about 6 and 9 inches. The sides can be of differing lengths so long as a trough can be formed and the flap can be folded when not in use. In a particular embodiment, the side at fold line defined by Axis Z, where panels 12 and 4 join, and the side at the fold line defined by Axis Y, where panels 10 and 2 join have a length of about 6 inches. Accordingly, the outside edges of the foldable panels have a length of about 6 inches. In this embodiment, the side at fold line defined by Axis V, where panel 12 and 10 join has a length of about 8.5 inches. In an aspect, the other panels are sized in a similar fashion for uniformity and collapsibility.

When the foldable panels are in an open position, the upright panel and foldable panels form a trough. The present invention can include any number of troughs and the troughs can be shaped and sized as desired. In an embodiment, the planter or holder includes between about 1 and 10 troughs. FIG. 1 shows troughs 42, 44, 46 and 48. These troughs, when opened, have a shape of a four-sided angled receptacle for receiving soil/plantings/belongings. The shape of the trough can be of any shape so long as the trough, when opened, can hold belongings.

The panels can be molded and scored or coined to form foldable joints or fold lines. In an embodiment, the panels and base can be manufactured using an injection molding process. Briefly, injection molding is a manufacturing process by which a mold is made having the reverse three dimensional conformation of the item to be manufactured. A heated polymer is injected into the mold and allowed to cure or harden. The fold lines can then be coined or scored. The coining process involves precisely stamping the fold line at the desired location and subjecting the panels to a sufficiently high stress to form a channel or groove to act as a fold line. Alternatively, a groove can be cut into the panel to form the fold line. Techniques known in the art or later developed can be used to make the panels and/or base that are described herein.

In another embodiment, the panels can be made from a sheet of material (e.g., metal, wood, plastic) and cut to the required size and shape. In this case, the fold line or joints can be formed by joining the panels with a flexible material that is attached (e.g., with an adhesive) to the panels. The flexible piece that forms the fold lines, in an embodiment, is flexible yet strong. Examples of such materials include a flexible rubber or plastic, or non-elastic textile fabric such as nylon, canvas, vinyl, CORDURA® material, and polyester.

Accordingly, panels can be manufactured as a single piece or as separate pieces that are attached to one another. The pieces of the foldable planter or holder can be made from the same material or different materials, and can be solid, mesh, or solid with air holes at the bottom of the planter or holder. Materials that can be used to make the foldable planter or holder include, for example, plastic (e.g., thermoplastics and thermosetting polymers), rubber, cardboard, wood, metal, etc. Examples of thermoplastic materials include polyethylene, polypropylene, polystyrene, polyvinyl chloride, and polytetrafluoroethylene (PTFE). Examples of thermosetting polymers include epoxy resins and polyimides. Materials now known or developed in the future can be used. In an embodiment, the material is washable so that the planter or holder can be reused.

Figure 2:
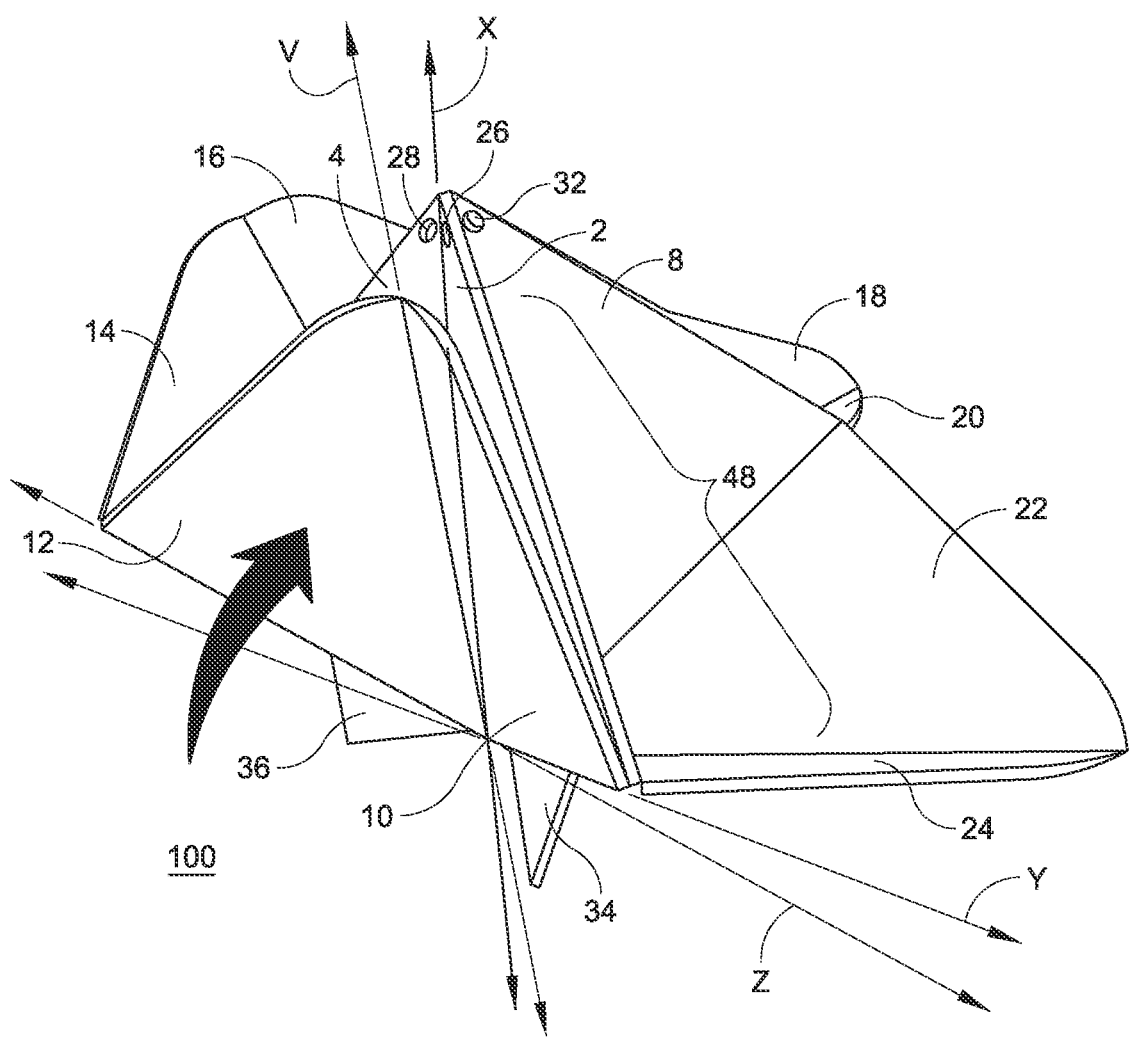
FIG. 2 is a perspective view of the foldable planter or holder of the present invention showing one pair of foldable panels in a closed position.

FIG. 2 shows panels 10 and 12 in a folded or closed position. These panels were folded at the fold lines defined by Axis Y and Z. In other words, trough 42 is in a folded or closed position. When folded, as described herein, the angle between Axis V and Axis X becomes smaller, more of an acute angle until it reaches almost zero degrees (e.g., between about 1 and about 5 degrees) Axis Y and Z at the fold lines substantially maintain their angle with respect to axis X. At the bottom, base members 36 and 34 of the base can be seen, which are described further herein.

Figure 3:
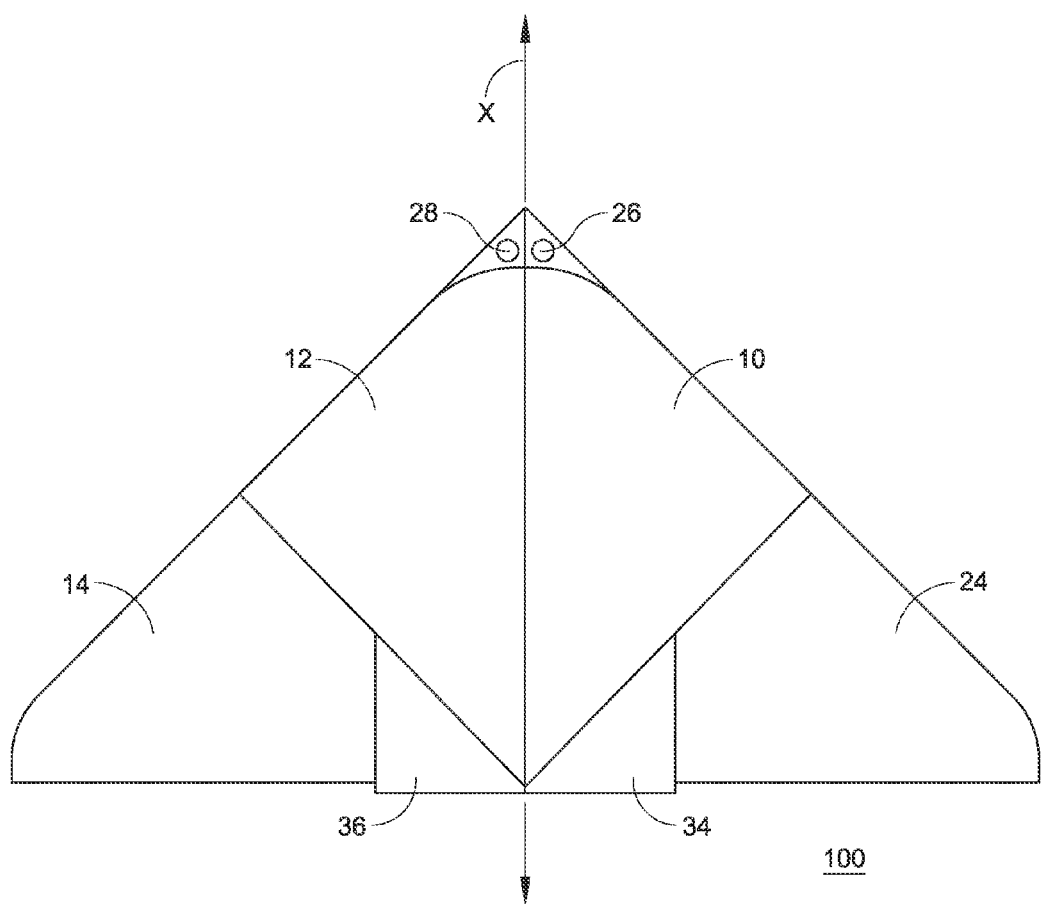
FIG. 3 is a side view of the foldable planter or holder of the present invention showing at least one pair of foldable panels in a closed position.

FIG. 3 shows the side view of the folded embodiment shown in FIG. 2. When a flap is folded, the side view shows a triangular shape of the entire foldable planter or holder.

Figure 4:
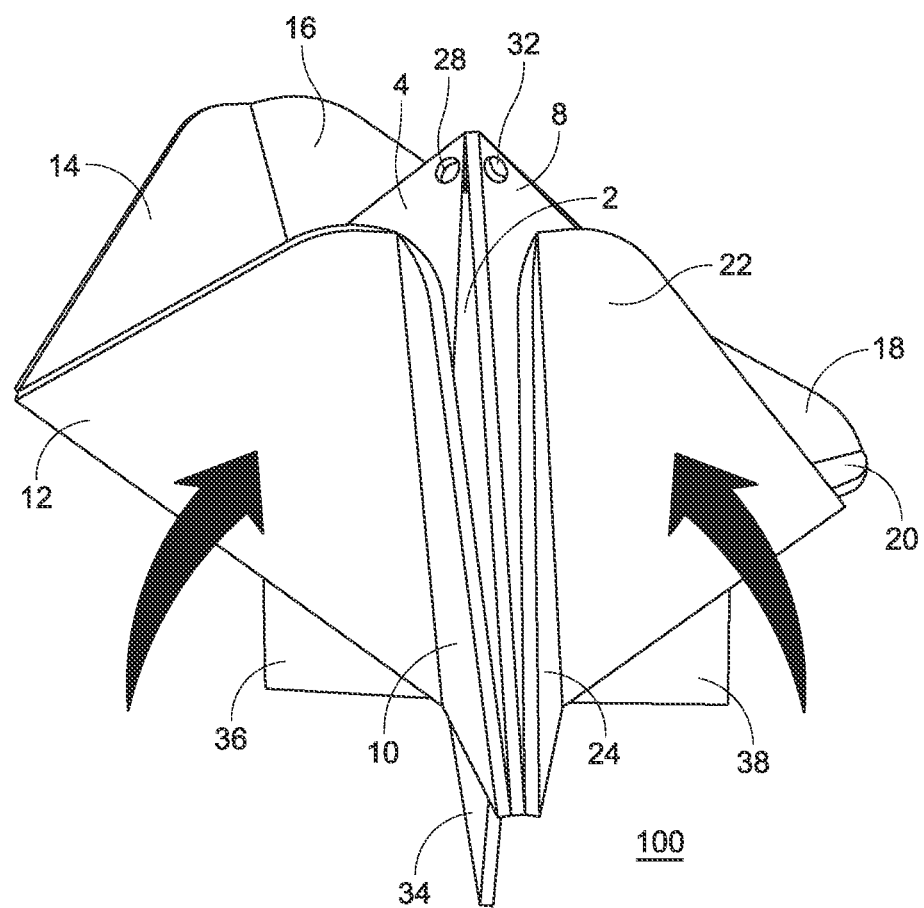
FIG. 4 is a perspective view of the foldable planter or holder of the present invention showing two pairs of foldable panels in a closed position.

FIG. 4 shows a second flap folded toward the upright panels. In particular, foldable panels 22 and 24 are folded to meet upright panels 8 and 2. Trough 48 is now in the closed position as well. Also, better shown in FIG. 4, is a set of 4 base members or supports that hold up the planter/holder when the planter/holder is in use. In the embodiment shown, base members 34, 36, and 38 form a base or a stand and are attached at the fold lines between the upright panels and the foldable panels (e.g., the fold lines at Axis Y and Z). An additional, fourth base member is present but not shown in the figures. The base members can be any support so long as it holds up the planter/holder and can be attached to any panel or fold line. In an embodiment, the base members can fold or collapse along with the panels for storage. In another embodiment, the base members are detachable. The base members are optional, especially when the planter/holder is used as a hanging planter/holder.

Figure 5:
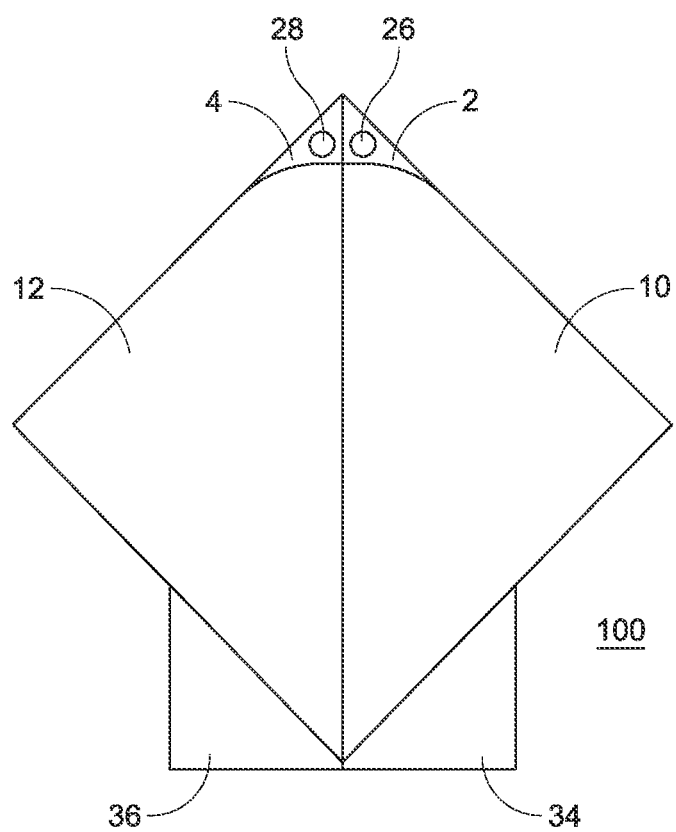
FIG. 5 is a side view of the foldable planter or holder of the present invention showing all of foldable panels in a closed position and the base members.

When all of the foldable panels of the planter/holder are in a closed position, the planter/holder can be fully collapsed into a flattened position or configuration. In addition to closing the foldable panels, the upright panels can be folded at Axis X. The side view of the planter/holder in a flattened position can be seen in FIG. 5. The planter/holder forms a diamond shape, sitting on the base. FIG. 6 shows a top view of the planter/holder in a folded position as the planter/holder is being flattened. The upright panels form an "X" shape and as the planter/holder is being flattened, two faces of two upright panels form an obtuse angle and get closer to about 180 degrees, while the opposite faces of the upright panels form more of an acute angle and get closer to about zero degrees (e.g., between about 1 and 5 degrees). In contrast to FIG. 6, FIG. 7 is a top view of a planter in which the flaps are in an open position.

Figure 8:
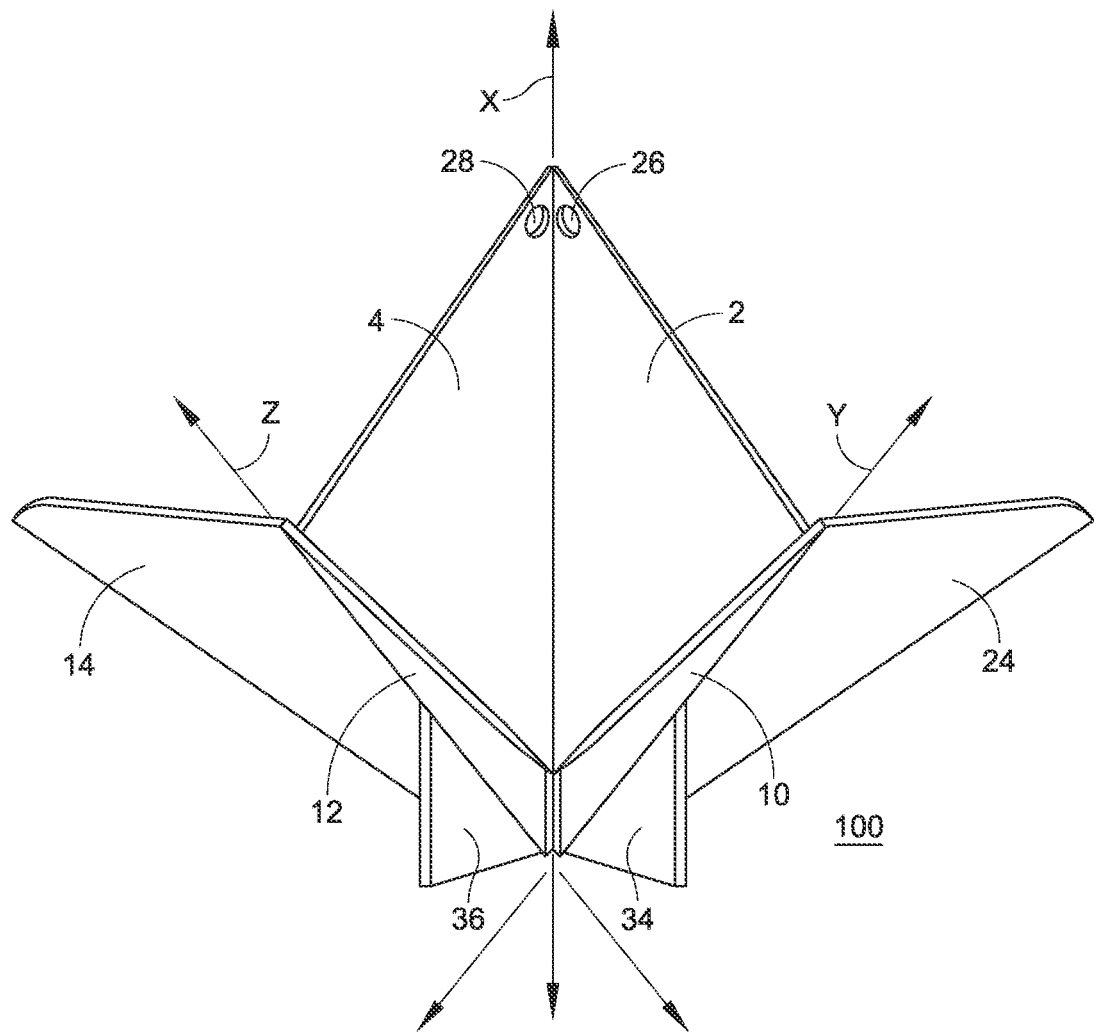
FIG. 8 is a side view of the foldable planter or holder of the present invention showing all of foldable panels in an opened position.
Figure 9:
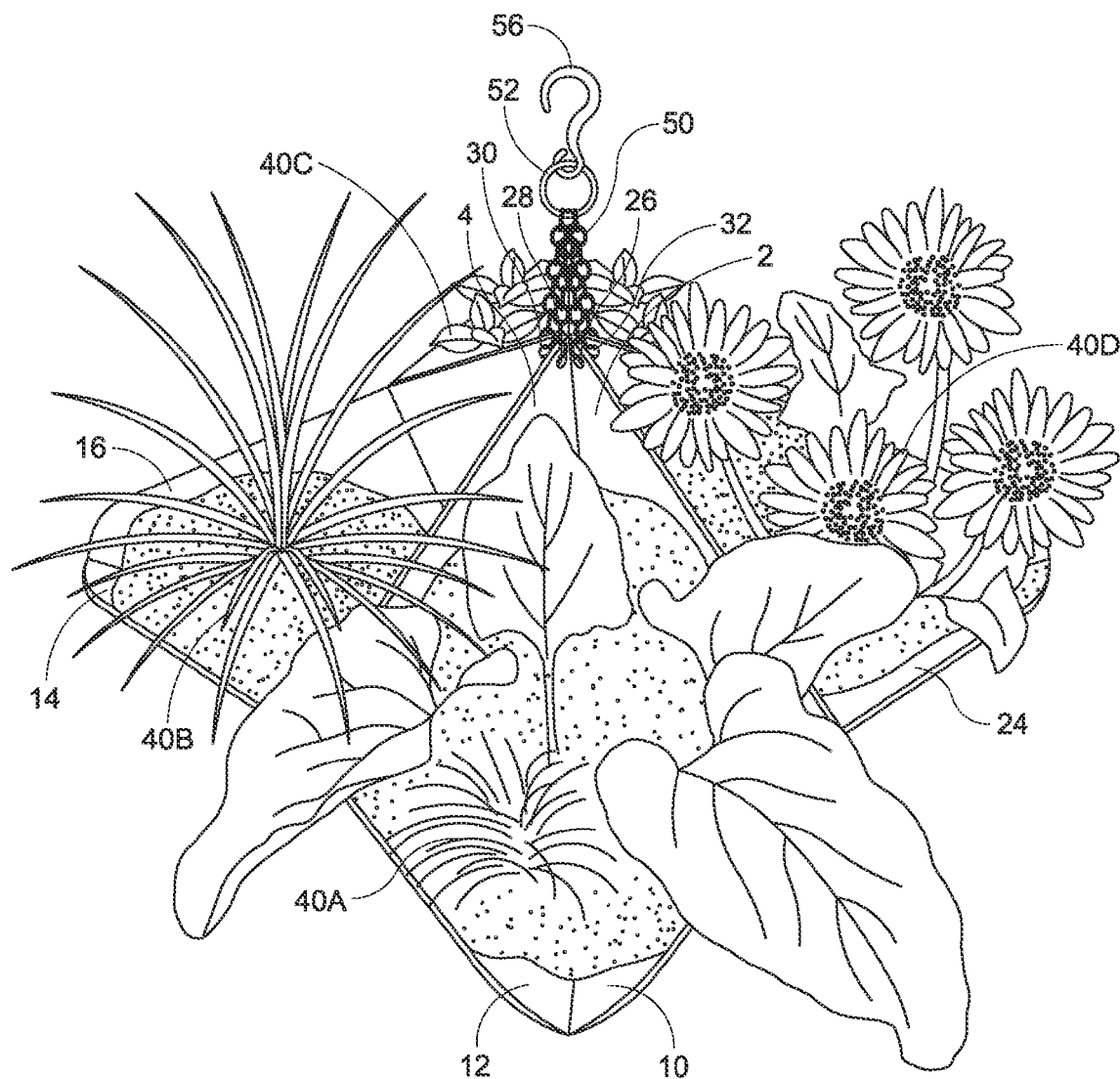
FIG. 9 is a perspective view of the foldable planter of the present invention showing it in use and having plantings therein.

FIG. 8 shows a side view of the planter or holder with flaps in an open position. From the side view, the foldable panels form "wings." As described herein, the foldable panels form an acute angle with respect to Axis X. FIG. 9 shows planter or holder 100 in use with plantings 40A-D. Plantings to be used in such an embodiment can be any combination of soil, seeds, plants, and nutritional supplements/material for plants.

FIG. 9 also shows planter or holder 100 having openings 26, 28, 30, and 32 to receive a loop or hanger. These are circular openings but openings can be any size or shape (e.g., circular, square, rectangular, triangular, rhombic, or irregular). The size (e.g., diameter) of the openings range from about ⅛ inch to about ½ inch and can be positioned on some or all of the upright panels. The hanging means includes chains 50, ring 52, and hook 56. The hanger can include any number of items so long as it allows the planter or holder to be hung. For example, the hanger can simply be a hook that is inserted into one or more openings in one or more upright panels. The hanger assembly is optional, especially in the case in which a base comprising one or more base members is used. Any means for hanging the planter or holder can be used and include any configuration that allows the planter or holder to be hung. Examples of hooks, loops, rings, ropes, ties, and the like can be used as a hanging means. The planter or holder can also optionally include a plurality of openings at the bottom of the planter or holder to allow water to drain.

Figure 10:
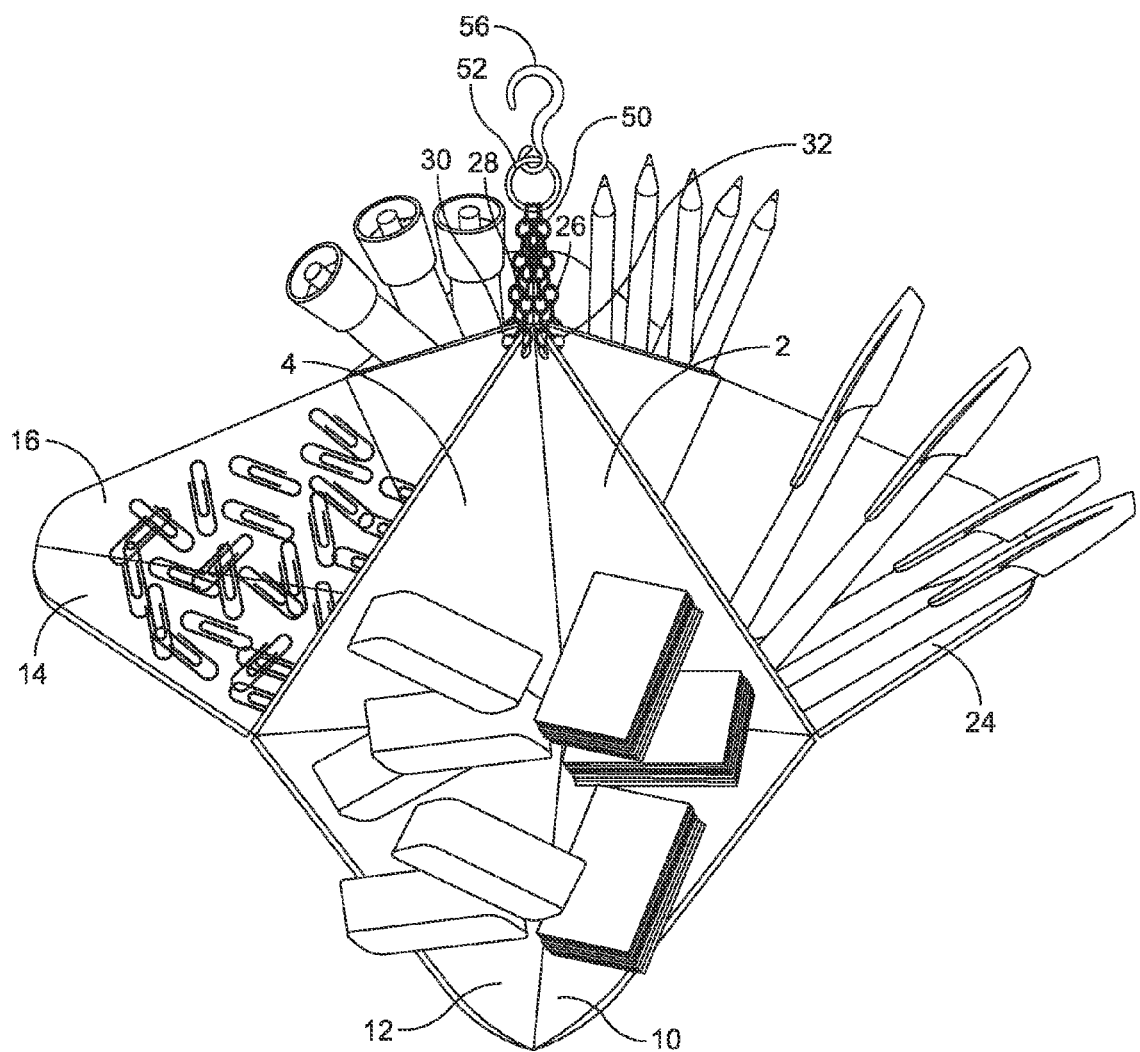
FIG. 10 is a perspective view of the foldable holder of the present invention showing it in use with personal belongings, which in this figure, specifically are office supplies.

FIG. 10 shows a holder that that is being used to hold various office supplies. Holder 100 is shown to have openings 26, 28, 30, and 32. These openings can receive a loop or a hanger or any other item that allows suspending the holder from a point or points above it. The holder can also be held upright from a point or points that are beside or below the holder using a supporting means (e.g., rigid bars, cylinders, etc.) that pass through or reach the openings. The number of openings can vary. In certain embodiment, upright panels can be left without openings, or the openings of some upright panels can be left unused. Some upright panels can have more than one opening. The shown openings are disk shaped, but they can also be shaped in any other way (e.g., circular, square, rectangular, triangular, rhombic, or irregular) as long as they serve their function of allowing a hanging means to support the holder. The hanging means shown in the drawing include chain 50, ring 52, and hook 56. The hanger can include any number of items as long as it supports the holder or allows it to be hung. For example, the hanger can simply be a hook that is inserted into one or more openings in one or more upright panels. The hanger assembly is optional, especially in the case in which a base comprising one or more base members is used. Examples of hooks, loops, rings, ropes, ties, and the like can be used as a hanging means. The holder can have a plurality of additional openings at its other parts (e.g., panels), for example to provide an aesthetic appeal. Movable panels 10 and 12 are shown to be supporting erasers and note pads, movable panels 14 and 16 are shown to be supporting clips, movable panels 18 and 20 are shown to be supporting pencils and highlighters, and movable panels 22 and 24 are shown to be supporting pens.

The present invention also includes a system that has the folding planter or holder described herein. The system can include foldable planter or holder with the upright panels and foldable panels. The base and/or hangers can also be provided or sold with the planter or holder. In this example, the user can attach the base and/or hanger to the foldable planter or holder. Additionally, the system, when used as a planter, can further include a planter that is pre-seeded or have young plantings already placed therein e.g., in the case of a starter planter. The system can optionally further include seeds, plants, soil, plant nutrients, and any other planting accessory. Other than plantings, the system can include various belongings, such as personal items or office supplies. Exemplary office supplies include pens, pencils, sharpeners, erasers, penholders, envelope openers, envelope sealers, scissors, highlighters, sticky notes, notebooks, calendars, printer inks, CDs, DVDs, CD-holders, DVD-holders, post-it notes, clips, push-pin sets, tapes, desk supplies, envelopes, USB-drives, phones, cellular phones, phone chargers, cameras, tissue papers, first aid supplies, band-aid, medical supplies, supplements, vitamins, snacks, coffee supplies, coffee/tea, dental products such as floss and toothpaste, bath products such as soaps, shampoo, and shaving needs, etc.

The present invention further includes methods of using the planter or holder described herein. The methods include placing the foldable panels into an opened position, as described herein, and placing plantings or belongings therein. Plantings are defined as soil, seeds, plants, water, plant nutrients, and any combination thereof Belongings are defined as anything that is a personal, a household (including plantings), or an office item. The methods include hanging the foldable planter or holder, or utilizing a stand for the foldable planter or holder.

When not in use, the methods include placing one or more flaps into the closed position, as described herein. The methods further include collapsing the foldable planter or holder into a flattened position or configuration, and storing the foldable planter or holder.

Exemplification

The foldable planter or holder shown in the figures was made. The panels of planter or holder were made from a cardboard material and the fold lines were held together with adhesive tape material. Foldable panels 10, 12, 14, 16, 18, 20, 22, and 24 were made with the following measurements: 6.25"×6.5"×9.0" (which, after cutting a portion from the top side to make the openings accessible became 6.25"×5"×8"). The length along the fold line at Axis V measured 9.0" while the lengths of the panel at the fold lines along Axes Y and Z measured 6.25". The outer edge of each foldable panel measured 6.5". Similarly, the upright panels, namely panels 2, 4, 6, and 8 had corresponding complementary measurements and the panels measured 6.25" by 6.5" by 9.0". The length measured along the fold line at Axis X is 9.0" and the outer edge of the upright panel measures 6.5". The edge of the upright panels at the fold line along Axes Y and Z measures about 6.25". The panels were made in a uniform manner.

The base members, members 34, 36, 38 (one member not shown), measured 2.2"×2.2"×3.1" with the longer edge attached to the fold line at Axis Y and Z, as described herein.

The openings at the top of the upright members had a diameter of 9/32" and are positioned 3/8" from the fold line at Axis X, and 1" from the outer edge of the upright panel. These openings are used to receive a hanging means such as chains, rings, hooks and the like.

The relevant teachings of all the references, patents, and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A foldable holder that is adapted to contain a plurality of belongings, wherein the foldable holder comprises:
  a) one or more compartments defined by an array of interconnected panels, each of the interconnected panels being substantially planar, wherein, when in use, at least one of the one or more compartments stores one of the belongings, wherein each of the one or more compartments comprise:
    i) one or more triangularly shaped upright panels to form an upright central core;
    ii) one or more movable panels, each triangularly shaped upright panel being attached to at least one of the one or more movable panels to form a trough to support one of the belongings when in use, and wherein each triangularly shaped upright panel has an opening to receive a loop or a hanger; and
    iii) one or more fold lines, wherein at least one fold line is between the one or more triangularly shaped upright panels and the one or more movable panels.

2. The foldable holder of claim 1, wherein each of the triangularly shaped upright panels, or each of the movable panels are attached to at least one adjacent triangularly shaped upright panel or to at least one adjacent movable panel along the one or more fold lines.

3. The foldable holder of claim 2, wherein when not in use, at least one of the movable panels folds at a fold line between at least one of the triangularly shaped upright panels and at least one of the movable panels.

4. The foldable holder of claim 3, wherein a second fold line transects the fold line between at least one of the triangularly shaped upright panels and at least one of the movable panels.

5. The foldable holder of claim 1, wherein each of the triangularly shaped upright panels or each of the movable panels has at least three sides.

6. The foldable holder of claim 1, further comprising a stand to hold the foldable holder upright.

7. The foldable holder of claim 1, further comprising a means for hanging the holder.

8. A foldable holder that is adapted to contain a plurality of belongings, the foldable holder comprises:
  a plurality of foldable compartments defined by an array of interconnected panels, each of the interconnected panels being substantially planar, wherein each compartment stores one of the belongings, wherein each panel is attached to at least one adjacent panel along a fold line, wherein when in use, each compartment comprises an upright panel pair and a movable panel pair to form a trough to support one of the belongings when in use, wherein the upright panel pair comprises one or more triangularly shaped upright panels forming an upright central core, and wherein each of the triangularly shaped upright panels has an opening to receive a loop or a hanger.

9. The foldable holder of claim 8, wherein an upright panel of the upright panel pair abuts a second upright panel of an upright panel pair of another compartment to form a partition between the compartments.

10. The foldable holder of claim 8, wherein the movable panel pair comprises one or more fold lines existing between adjacent panels.

11. The foldable holder of claim 10, wherein the movable panel pair folds at the one or more fold lines existing between the adjacent panels.

12. The foldable holder of claim 8, wherein the upright panel pair has a center fold line between each upright panel, the movable panel pair comprises one or more movable panels, and the movable panel pair has a center fold line between each movable panel.

13. The foldable holder of claim 12, wherein the one or more movable panels of the movable panel pair folds in a plane created by two axes of the fold lines existing between adjacent panels.

14. The foldable holder of claim 12, wherein the one or more movable panels of the movable panel pair can fold along, transect, or both fold along and transect a plane created by the center fold line of the upright panels and the center fold line of the one or more movable panels.

15. A foldable holder that is adapted to contain a plurality of belongings, the foldable holder comprises:
  a) an upright central core comprising one or more triangularly shaped upright panels, wherein the one or more triangularly shaped upright panels are substantially planar, and wherein each of the triangularly shaped upright panels has an opening to receive a loop or a hanger;
  b) one or more movable panels to form a trough used to support one of the belongings when in use, wherein the upright central core is attached to at least one of the one or more movable panels, and wherein the one or more movable panels are substantially planar; and c) one or more fold lines, wherein at least one fold line separates the upright central core from the one or more movable panels;

to thereby form one or more foldable compartments.

16. A foldable holder system that comprises:

a) a foldable holder that is adapted to contain a plurality of belongings, the foldable holder comprises:

i) an upright central core comprising one or more triangularly shaped upright panels, wherein the one or more triangularly shaped upright panels are substantially planar, and wherein each of the triangularly shaped upright panels has an opening to receive a loop or a hanger;

ii) one or more movable panels to form a trough used to support one of the belongings when in use, wherein the upright central core is attached to at least one of the one or more movable panels, and wherein the one or more movable panels are substantially planar; and iii) one or more fold lines, wherein at least one fold line separates the upright central core from the one or more movable panels;

to thereby form one or more foldable compartments; and b) a means for hanging the holder.

17. foldable holder system of claim 16, wherein the means for hanging the holder comprises a hook.

\* \* \* \* \*